(12) United States Patent
Wolfe, Jr. et al.

(10) Patent No.: US 8,141,231 B2
(45) Date of Patent: Mar. 27, 2012

(54) ELECTRIC MOTOR

(75) Inventors: Melvin E. Wolfe, Jr., Hallstead, PA (US); Mark E. Baer, Trout Run, PA (US); Alan R. Ayotte, Harpursville, NY (US)

(73) Assignee: Shop Vac, Williamsport, PA (US)

( * ) Notice: Subject to any disclaimer, the term of this patent is extended or adjusted under 35 U.S.C. 154(b) by 1711 days.

(21) Appl. No.: 10/662,683

(22) Filed: Sep. 15, 2003

(65) Prior Publication Data

US 2005/0057110 A1  Mar. 17, 2005

(51) Int. Cl.
*H02K 15/00* (2006.01)
(52) U.S. Cl. ............................... 29/596; 29/597
(58) Field of Classification Search .................. 29/596, 29/564.1, 564.6, 597, 732, 736; 310/68 R, 310/68 C, 50, 71, 239; 361/33; 318/476; 337/186, 251; 439/627
See application file for complete search history.

(56) References Cited

U.S. PATENT DOCUMENTS

| | | |
|---|---|---|
| 3,670,277 A | 6/1972 | Decker et al. |
| 4,056,749 A | 11/1977 | Carison, Jr. et al. |
| 4,287,446 A | 9/1981 | Lill et al. |
| 4,340,829 A | 7/1982 | McCoy |
| 4,484,096 A | 11/1984 | Sauerwein et al. |
| 4,491,752 A | 1/1985 | O'Hara et al. |
| 4,575,471 A | 3/1986 | Dibbern, Jr. et al. |
| 4,633,110 A | 12/1986 | Genco et al. |
| 4,720,646 A | 1/1988 | Torimoto |
| 4,765,054 A | 8/1988 | Sauerwein et al. |
| 4,851,725 A | 7/1989 | Keck |
| 5,019,741 A | 5/1991 | Fukui et al. |
| 5,138,212 A | 8/1992 | Wong et al. |
| 5,149,999 A | 9/1992 | Abo et al. |
| 5,214,331 A | 5/1993 | Yonei |
| 5,313,128 A | 5/1994 | Robinson et al. |
| 5,373,210 A | 12/1994 | Baer et al. |
| 5,549,253 A | 8/1996 | Beakes et al. |
| 5,685,061 A | 11/1997 | Beakes |
| 5,723,932 A | 3/1998 | Ito et al. |
| 5,736,805 A | 4/1998 | Hyatt, Jr. et al. |
| 5,773,907 A | 6/1998 | Rubinchik |
| 5,784,771 A | 7/1998 | Beakes et al. |

(Continued)

FOREIGN PATENT DOCUMENTS

DE   2040 465   2/1972

(Continued)

OTHER PUBLICATIONS

European Seach Report for Application No. EP 04 29 1709, dated May 29, 2007.

(Continued)

*Primary Examiner* — Thiem Phan
(74) *Attorney, Agent, or Firm* — Marshall, Gerstein & Borun LLP; Robert M. Gerstein; Richard M. LaBarge

(57) ABSTRACT

An electric motor is described in which a first magnet wire forms a first pole of the coil, is disposed across two terminals of a fuse, and terminates at a first end on a power switch. The portion of the first magnet wire between the terminals of the fuse is severed such that all current of the motor must travel through the conductor of the fuse. The second end of the first magnet wire terminates at dual tang terminal disposed on the brush housing.

9 Claims, 10 Drawing Sheets

U.S. PATENT DOCUMENTS

| | | | |
|---|---|---|---|
| 5,818,142 A | 10/1998 | Edleblute et al. | |
| 5,880,666 A * | 3/1999 | Matsuoka et al. | 337/186 |
| 6,058,595 A | 5/2000 | Lewchenko et al. | |
| 6,108,897 A | 8/2000 | Beakes et al. | |
| 6,152,776 A * | 11/2000 | Ikeda et al. | 439/627 |
| 6,294,850 B1 | 9/2001 | Yui et al. | |
| 6,683,396 B2 * | 1/2004 | Ishida et al. | 310/50 |
| 6,737,770 B2 * | 5/2004 | Sunaga et al. | 310/68 C |

FOREIGN PATENT DOCUMENTS

| | | |
|---|---|---|
| DE | 25 35 609 | 2/1977 |
| DE | 28 42 119 | 12/1979 |
| DE | 32 29 711 A1 | 2/1984 |
| DE | 36 04 675 A1 | 8/1987 |
| DE | 200 04 185 U1 | 8/2001 |
| EP | 0 235 443 A1 | 9/1987 |
| EP | 0 642 205 A2 | 3/1995 |
| EP | 0 714 154 A1 | 5/1996 |
| EP | 0 778 655 A2 | 6/1997 |
| GB | 1 209 682 | 10/1970 |
| JP | 61-69350 | 4/1986 |
| WO | WO 00/51223 | 8/2000 |
| WO | WO-02/03531 A1 | 1/2002 |
| WO | WO 02/50981 A1 | 6/2002 |
| WO | WO-03/007458 A2 | 1/2003 |

OTHER PUBLICATIONS

Communication & Partial European Search Report corresponding to co-pending European Patent Application Serial No. 04291709.6-1242, European Patent Office, dated Feb. 16, 2007, 5 pages.

* cited by examiner

ELECTRIC MOTOR

TECHNICAL FIELD

The disclosure is generally related to electric motors, and more particularly to a method of assembling an electric motor without a separate lead wire.

BACKGROUND

Prior electric motors have been assembled with a magnet wire that is terminated at a first terminal of a fuse. A separate lead wire is attached to the second terminal of the fuse at one end, and to a power switch on its other end. By closing the power switch, current flows across the switch and through the lead wire. If the conductor of the fuse is in tact, the current travels across the conductor and into the magnet wire and the coil.

The current method is inefficient because two separate wires are necessary, and thus separate steps are required in the manufacture of the electric motor. First a magnet wire must be attached to the fuse. Then, a separate lead wire must be included, with a first end attached to the fuse, and a second end attached to the switch. These separate steps generally require separate operations by machines from at least two work stations. It would be helpful if this procedure of manufacture could be made faster and less expensive.

Figure 1:
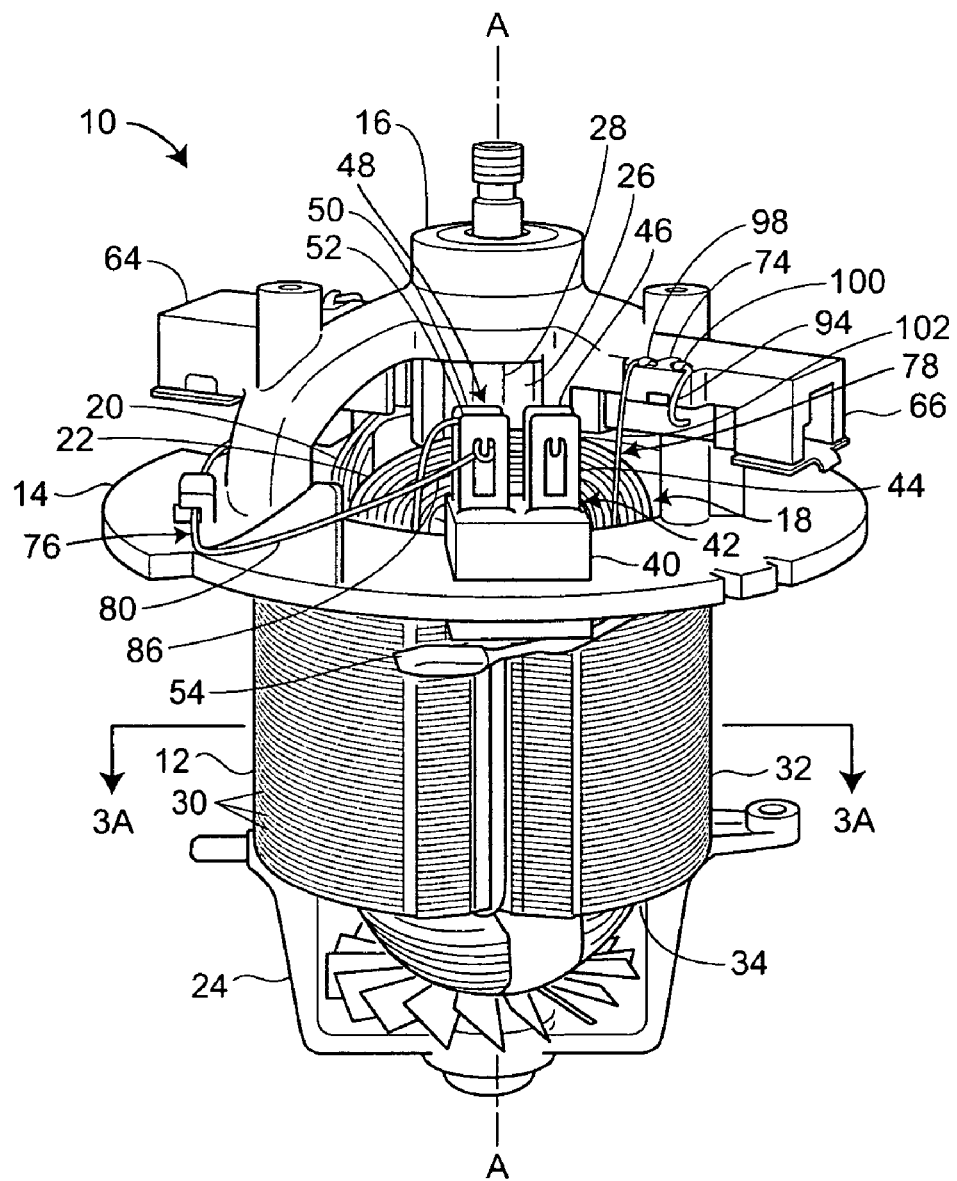
FIG. 1 is a perspective view of the front of an example of an electric motor.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and the equivalents falling within the spirit and scope of the invention as defined by the appended claims.

DETAILED DESCRIPTION

Figure 2:
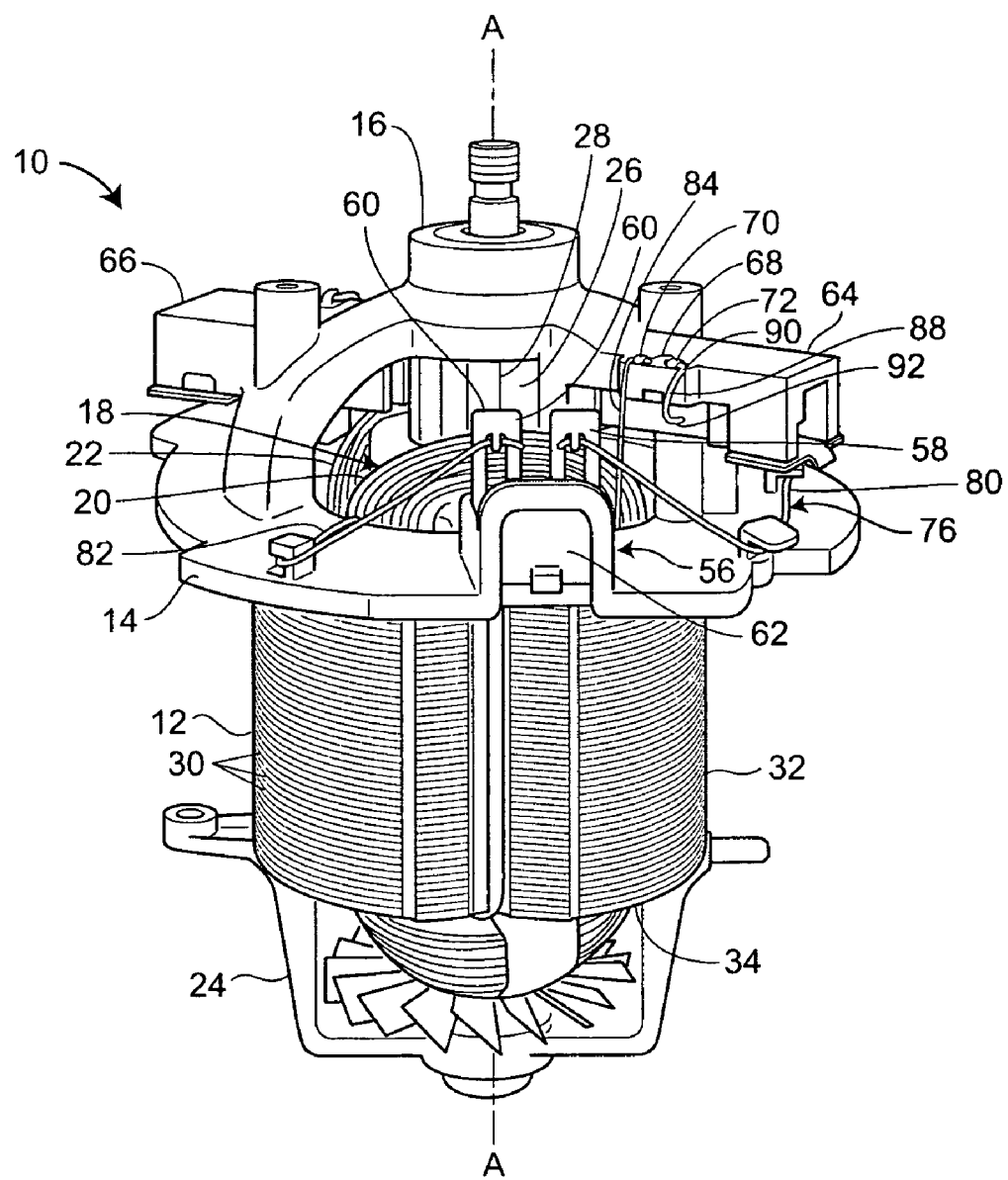
FIG. 2 is a perspective view of the rear of the electric motor of FIG. 1.

Referring now to the drawings, and particularly to FIGS. 1 and 2, an example of an electric motor 10 is disclosed. The motor 10 includes a stator 12, a winding board 14, and a lower housing 16 (shown on the top in FIGS. 1 and 2). Supported by the stator 12 and the winding board 14 is a coil 18, including a first pole 20 and a second pole 22. Fastened to the stator 12 is an upper housing 24 (shown on the bottom in FIGS. 1 and 2). An armature 26 with a commutator 28 is rotatably mounted within the upper housing 24 and the lower housing 16, and is rotatable about axis A-A, as is known in the art.

Stator

The stator 12 can comprise a series of laminations 30, each of which is an annular plate with a large interior opening. The laminations 30 can be made from cold rolled steel, for example SAE 1010 or 1008, and can be welded together via plasma welding, as is known in the art. By stacking several laminations 30, a tubular shape with an exterior annular surface 32 and an interior annular surface 34 is created.

Figure 3:
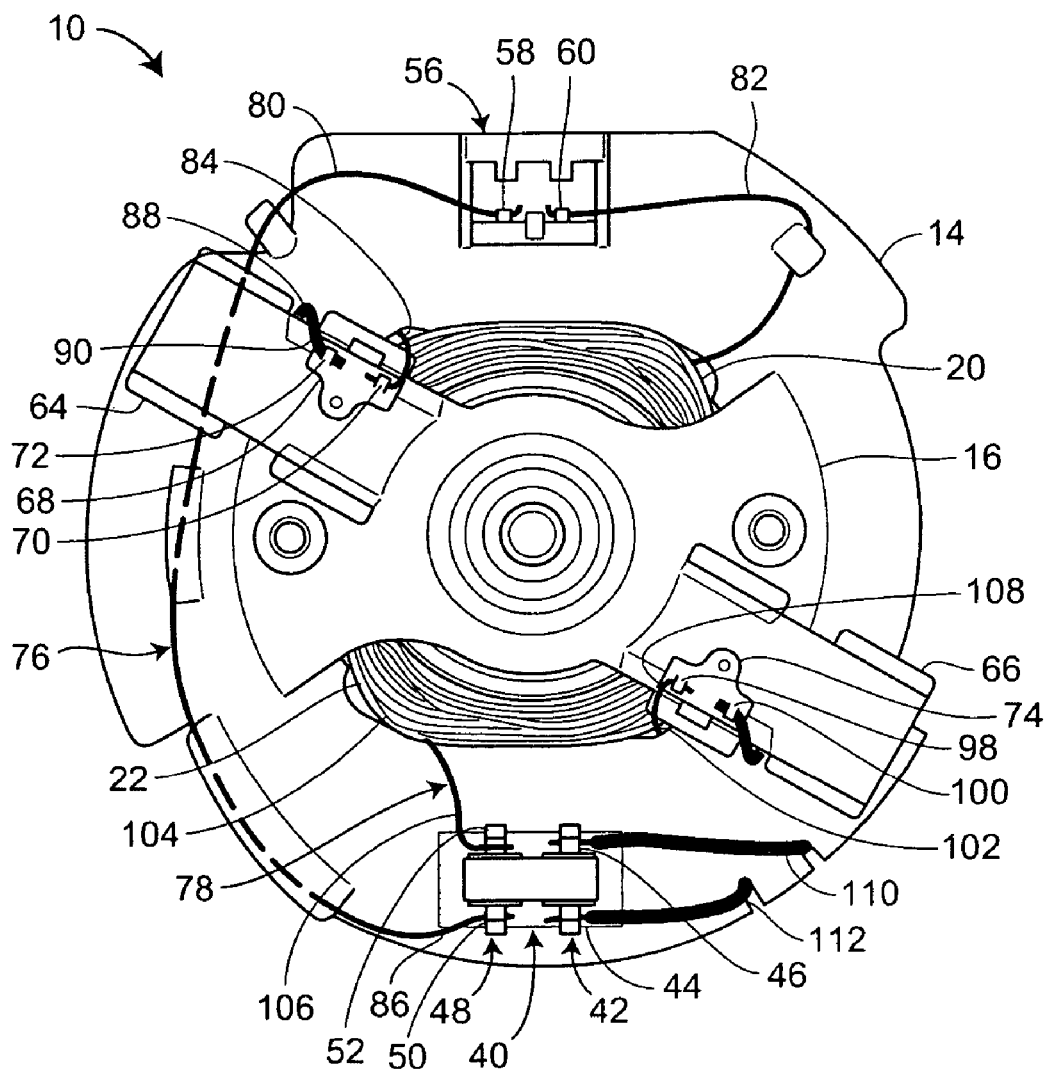
FIG. 3 is a top view of the electric motor of FIG. 1.
Figure 3A:
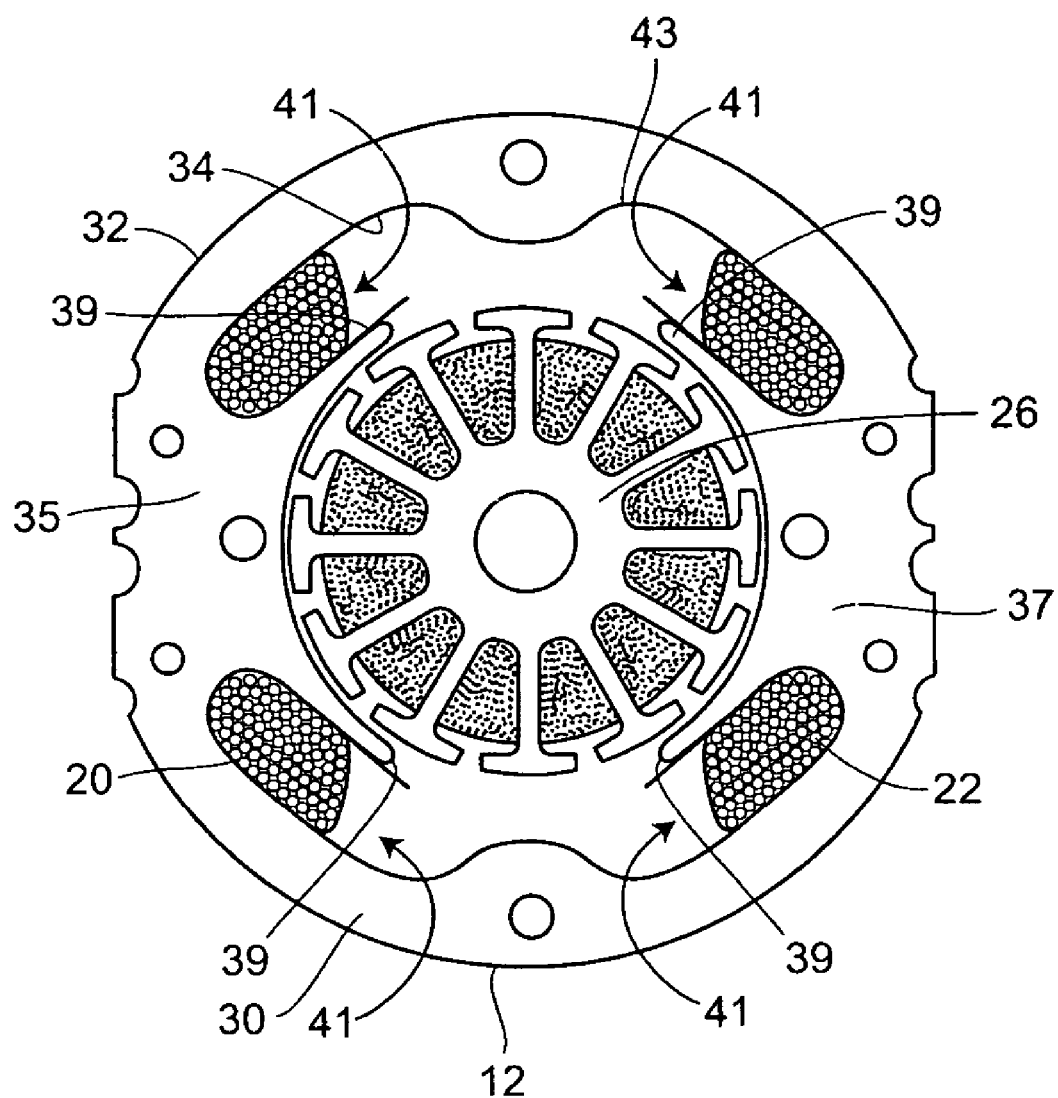
FIG. 3A is a sectional view of the electric motor taken along line 3A-3A in FIG. 1.

As shown in FIG. 3A, the interior annular surface 34 also includes a first hook-like protrusion 35 and a second hook-like protrusion 37, each of which project inwardly towards the center axis A-A. The first protrusion 35 is used to support the first pole 20, while the second protrusion 37 is used to support the second pole 22, as is commonly known. Each of the first protrusion 35 and the second protrusion 37 include pole tips 39 that define kidneys 41. The interior annular surface 34 can include insulation 43 to protect and insulate it from the coil 18 as is commonly known in the art.

Winding Board

Figure 4:
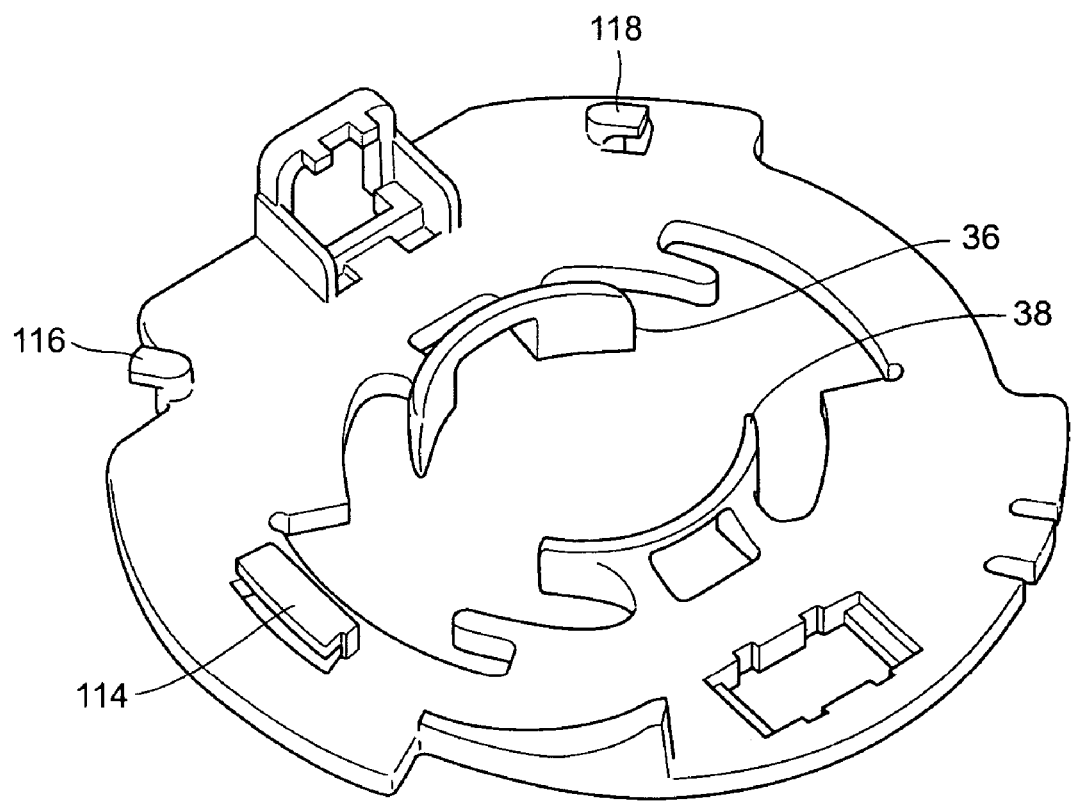
FIG. 4 is an perspective view of the winding board of the electric motor of FIG. 1.

As can be seen in FIGS. 1, 2 and 4, the winding board 14 is disposed on the stator 12. The winding board 14 is an annular plate with a large interior opening. The winding board 14 is made of a non-conductive material, for example a thermoplastic such as a glass-filled polyester, and further includes a first lug 36 and a second lug 38. The first lug 36 is used to support the first pole 20 on the end of the motor 10 nearest the lower housing 16. The second lug 38 is used to support the second pole 22 on that same end.

The winding board 14 includes structure to receive and route the wiring of the motor 10 such that current is supplied to the coil 18. Disposed on the winding board 14 is a switch 40 (see FIG. 1) that is used to make connections with wiring. The switch 40 includes an external terminal 42 that can receive current from an external source. The external terminal 42 includes a first block 44 and a second block 46. The switch 40 further includes an internal terminal 48 which can deliver current to the motor 10. The internal terminal 48 also include a first block 50 and a second block 52.

Each of the first and second blocks 44, 46, 50, 52 of the internal and external terminals 42, 48 can employ a tang for connection to the wiring of the motor 10. A tang is simply a small plate of electrically conductive material with a flap pushed up such that an exposed wire can be crimped between the flap and the plate, to hold it against the plate, thereby providing an electrical connection from the wire to the plate. Other connections can be employed such as male-female terminals, sonic welding, or soldering.

The switch 40 also includes a lever 54 which moves between a first position and a second position. In the first position, electric current can be carried between the external terminal 42 and the internal terminal 48. If the lever 54 is moved to the second position, however, the circuit is opened, and no current can be carried between the external terminal 42 to the internal terminal 48, thus cutting power to the motor 10. Other examples of switches, such as three position switches, can likewise be used.

As seen in FIG. 2, disposed on the winding board 14 is a fuse 56. While a fuse is disclosed herein, a circuit breaker could also be used. The fuse 56 includes an input terminal 58, an exit terminal 60 and a conductor 62. The input terminal 58 and the exit terminal 60 can both use tangs or other structure to connect to the wiring. As is known, current flows from the input terminal 58 across the conductor 62 and to the exit terminal 60. If a predetermined amount of current crosses the conductor 62, the conductor 62 melted such that the circuit is opened and no current can flow from the input terminal 58 to the exit terminal 60.

Lower Housing

Figure 5:
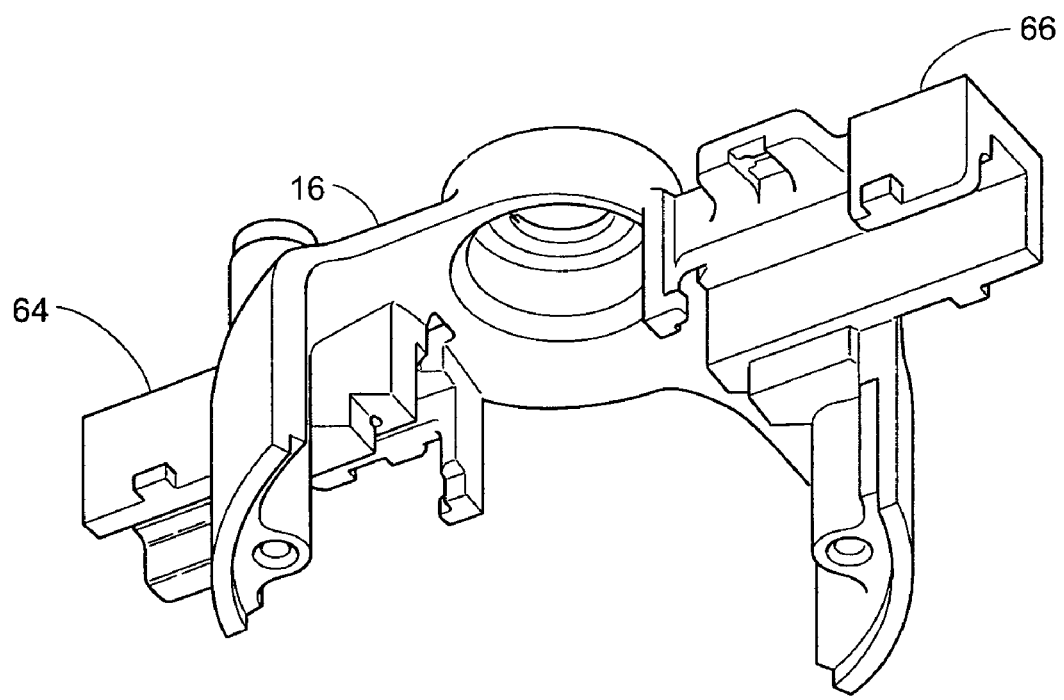
FIG. 5 is an perspective view of the lower housing of the electric motor of FIG. 1.
Figure 6:
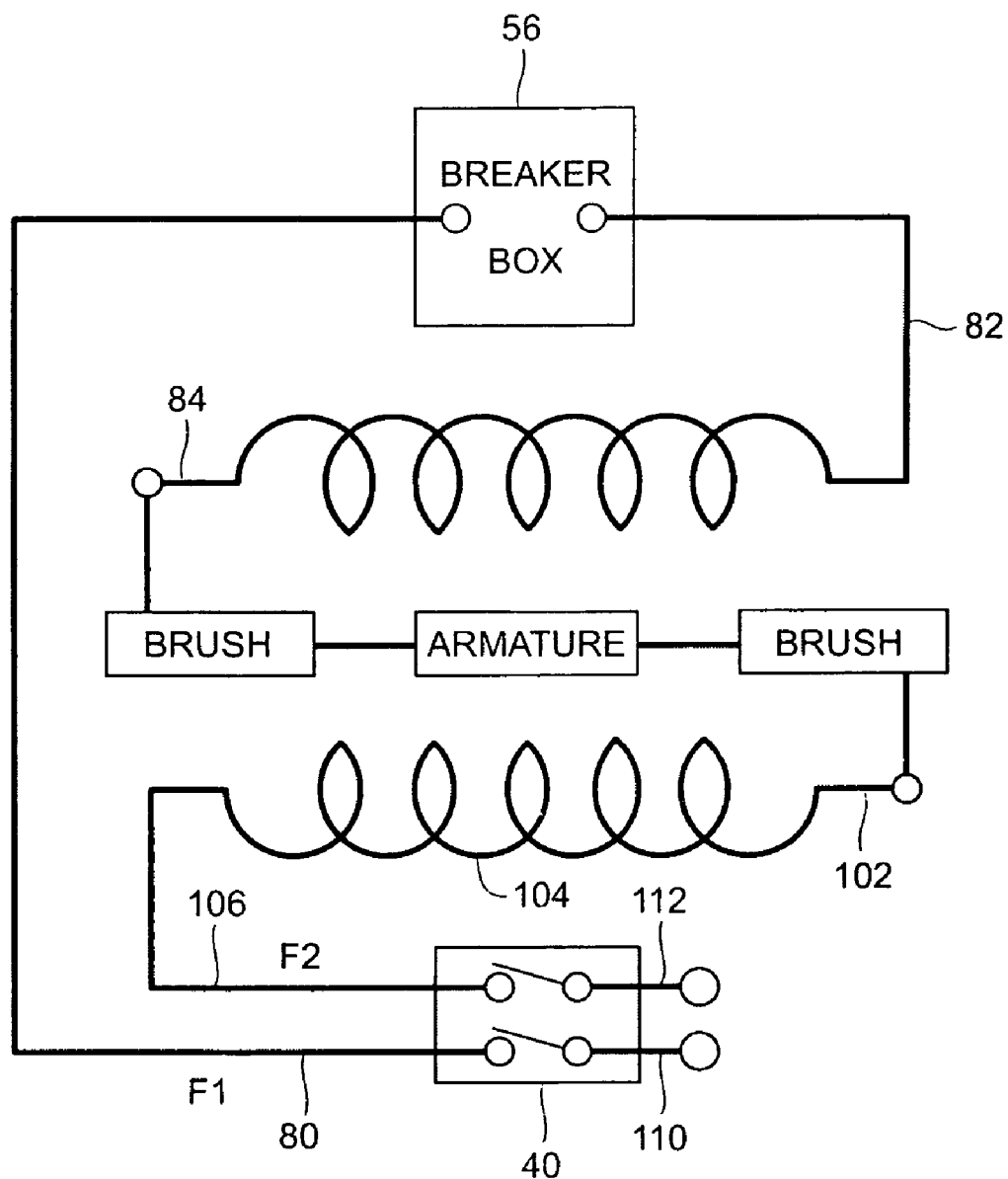
FIG. 6 is a wiring diagram of the electric motor of FIG. 1.

The lower housing 16, best seen in FIGS. 3 and 5, is mounted to the winding board 14, and includes structure to receive current from the coil 18 and carry it to and from the armature 26.

Figure 7:
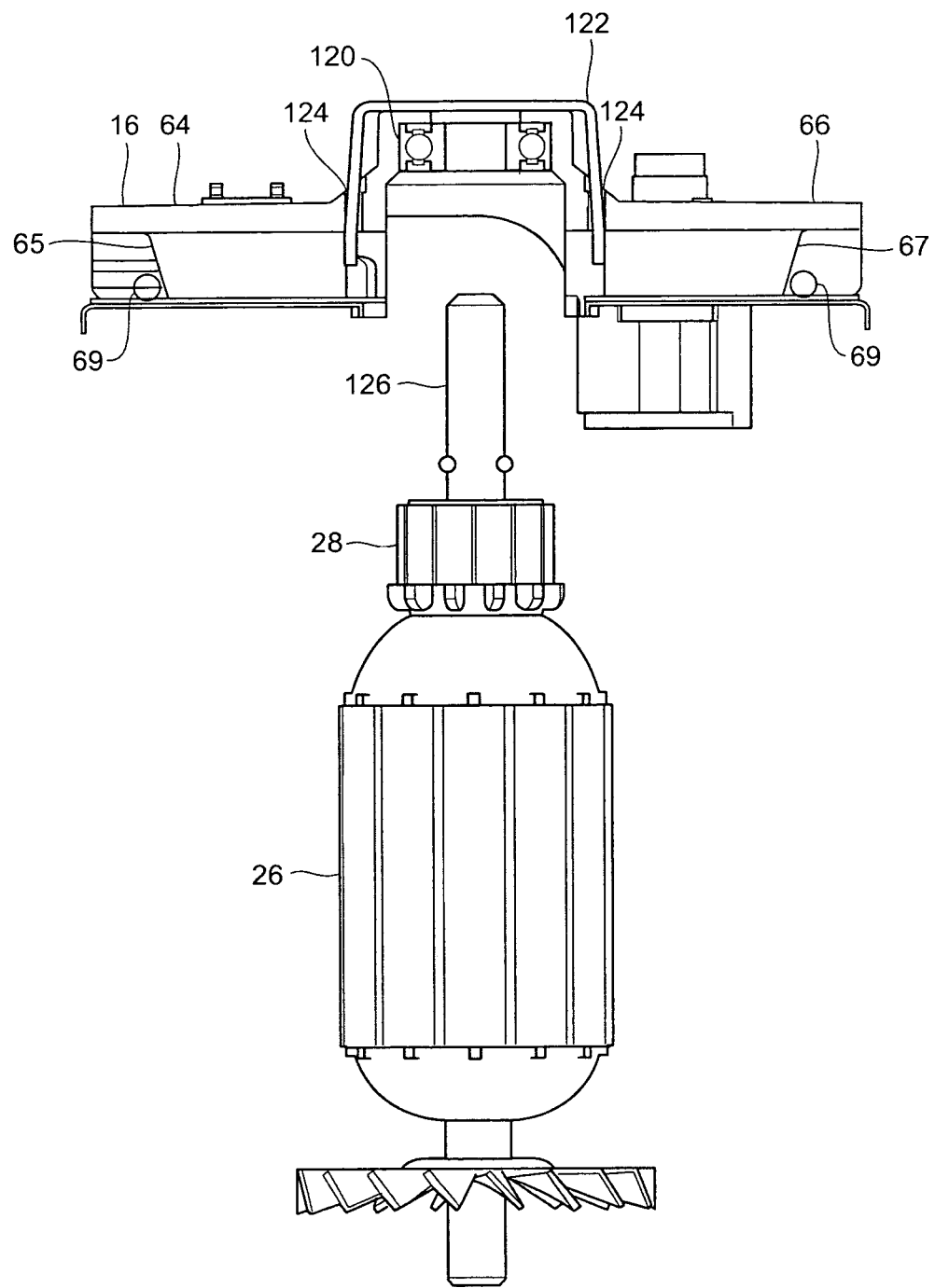
FIG. 7 is a side view of the armature and lower housing of the electric motor of FIG. 1, prior to assembling the armature in the housing.
Figure 8:
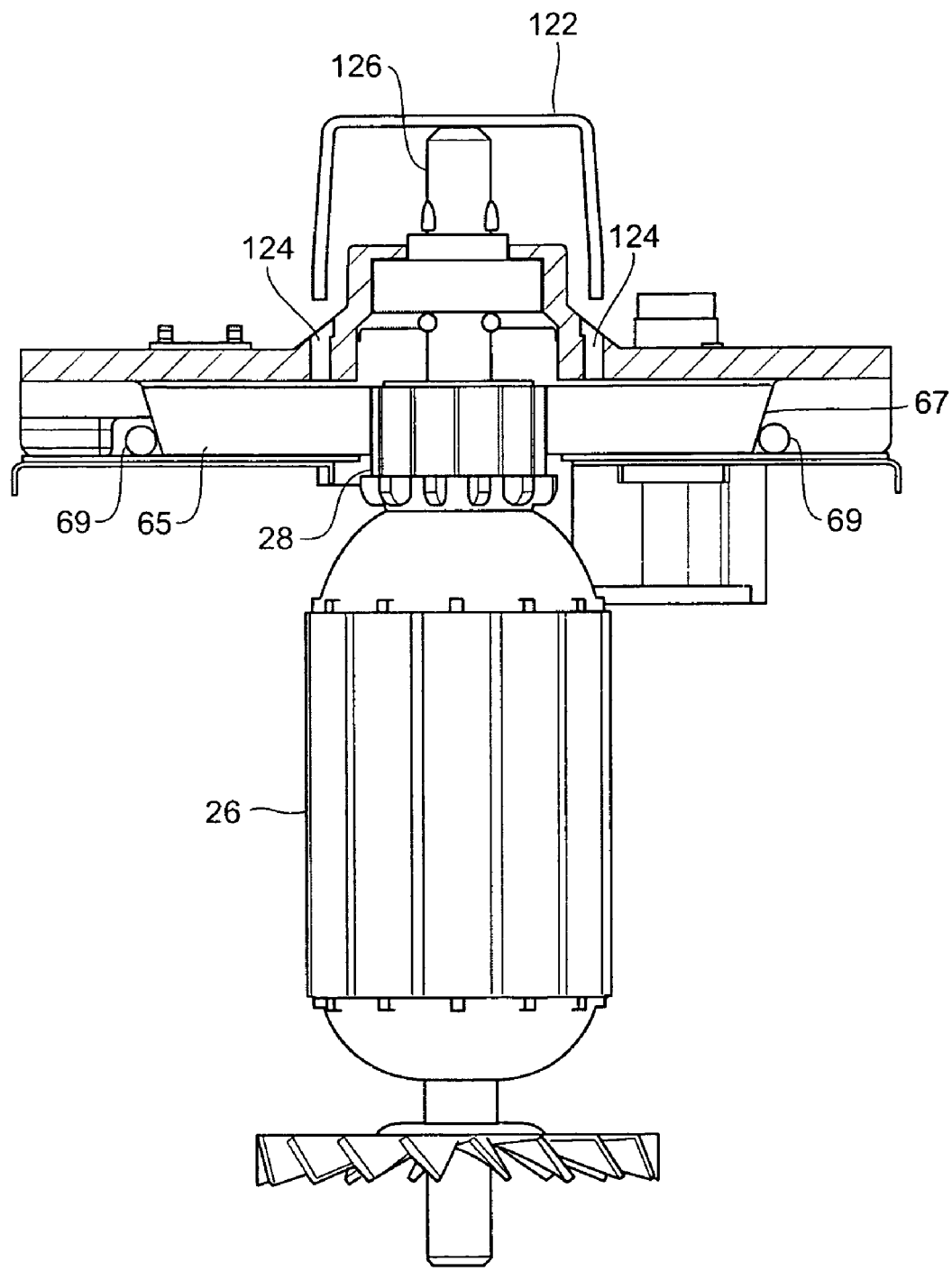
FIG. 8 is a side view of the armature and lower housing of the electric motor of FIG. 1, upon assembling the armature in the housing.

The lower housing 16 may be manufactured from a similar material as the winding board 14. The lower housing includes a first brush housing 64 and a second brush housing 66. Disposed within each brush housing 64, 66 is an electrically conductive brush 65, 67 (seen in FIGS. 7 and 8), which is urged, usually by a spring-loaded member 69, radially inwardly toward axis of rotation A-A and the armature 26 (See. FIGS. 7 and 8). As is known in the art, the brushes 65, 67 transmit the current to the rotating armature 26 through the commutator 28.

As seen in FIG. 3, fastened to the top of the first brush housing 64 is a first dual tang terminal 68. The first dual tang terminal 68 is manufactured from an electrically conductive material, such as brass or copper, and includes a first tang 70 and a second tang 72 configured for the connection of wiring as described earlier. The first and second tangs 70, 72 are electrically connected to each other via the conductivity of the terminal 68 itself. Accordingly, a wire connected to the first tang 70 is electrically connected to a wire connected to the second tang 72. Fastened to the top of the second brush housing 66 is a second dual tang terminal 74. It can be similar to the first dual tang terminal 68. Of course, other known methods and structure for attaching wire to a terminal can be used.

Wiring

Referring now to FIGS. 1-3, the wiring of the motor 10 will be described. In general, the wiring of motor 10 is comprised of a first magnet wire 76 and a second magnet wire 78. The first magnet wire 76 is a single wire that forms a first start portion 80, a first coil portion 82, and a first finish portion 84. The first magnet wire 76 is attached at a first end 86 to the first block 50 of the internal terminal 48 of the switch 40. The first magnet wire 76 is further disposed across the tang of the input terminal 58 of the fuse 56. The length of the first magnet wire 76 disposed between the internal terminal 48 of the switch 40 and the input terminal 58 of the fuse 56 is known as the first start portion 80.

The first magnet wire 76 is attached to the tang of the exit terminal 60 of the fuse 56. The first magnet wire 76 is further wrapped many times around the lug 36 of the winding board 14, as shown in FIG. 3, and the hook like projection of the stator 12 to form the first pole 20. The length of the first magnet wire 76 disposed after the fuse 56 and within the first pole 20 is known as the first coil portion 82.

The first magnet wire 76 extends out of the first pole 20 and is terminated on the first tang 70 of the first dual tang terminal 68 on the first brush housing 64. The length of the first magnet wire 76 after the first pole 20 and up to the first dual tang terminal 68 is known as the first finish portion 84.

The first dual tang terminal 68 includes a first tang 70 and a second tang 72 that are electrically connected to each other through metallic material of the terminal 68 itself. A first brush wire 88 has a first end 90 disposed on the second tang 72 of the first dual tang terminal 68, and a second end 92 disposed on the first brush housing 64 (See FIG. 2). The first brush wire 88 is electrically connected to the first brush 65 slidingly disposed within the first brush housing 64, as is known in the art.

As shown in FIGS. 7 and 8, the first brush 65 is urged forward to the axis of rotation A-A and into physical and electrical contact with the commutator 28 and the armature 26. The armature 26 spins around the axis of rotation A-A while in contact with the first brush 65.

A second brush 67 is disposed within the second brush housing 66 opposite the first brush housing 64. The second brush 67 is also urged forward into contact with the armature 26. A second brush wire 94 connects the second brush housing 66 to a second tang 100 on the second tang terminal 74.

Referring back to FIGS. 1-3, the second magnet wire 78 is also single wire that forms a second finish portion 102, a second coil portion 104, and a second start portion 106. The second end 108 of the second magnet wire 78 is disposed on the first tang 98 of the second tang terminal 74, and extends downward and is wrapped many times about the second lug 38 in the winding board 14 and the second hook-like protrusion in the stator 12 to form the second pole 22 of the coil. The length of the second magnet wire 78 between the second tang terminal 74 and the second pole 22 is known as the second finish portion 102. The length of the second magnet wire 78 within the second pole 22 is known as a second coil portion 104.

The second magnet wire 78 then exits the second pole 22 and is connected to the second block 52 of the internal terminal 48 on the switch 40. The length of the second magnet wire 78 between the internal terminal 48 and the second pole 22 is known as a second start portion 106.

As seen in FIG. 3, power cords 110 and 112 are fastened to the first and second blocks 44, 46 of the external terminal 42 on the switch 40. The power cords 110 and 112 provide electric current to the motor 10.

In this example, the first magnet wire 76 is a single, unitary wire upon installation in the motor 10. The first magnet wire 76 is attached to the first block 50 of the internal terminal 48, is disposed across both the input terminal 58 and the exit terminal 60 of the fuse 56, is wrapped about the first lug 36 of the winding board 14 to form the first pole 20 of the coil 18, then terminates on the first dual tang terminal 68. To ensure operation of the fuse 56, the first magnet wire 76 is severed in between the input terminal 58 and the exit terminal 60 such that the wire itself cannot carry current, and any current that flows to the coil 18 flows through the conductor 62 for the protection of the motor 10.

Referring now to FIG. 4, it can be seen that the winding board 14 is adapted to route the first magnet wire 76 and the second magnet wire 78 about the winding board 14. A first clip 114, a second clip 116, and a third clip 118 are disclosed. However, more or less clips could be used to route the wire.

Current Flow and Use of Motor

With reference to FIGS. 1, 2, 3 and 6, the current flow will now be described. With the lever 54 of the switch 40 in the first position, current can be supplied to the motor 10 by the power cords 110, 112. Current flows through the first finish wire 80, across the fuse 56 and into the first coil wire 82 and through the first pole 20 of the coil 18. Current then travels out of the first pole 20 and through the first start wire 84 to the first dual tang terminal 68. Current travels through the first dual tang terminal 68, the first brush wire 88 and into the first brush 65. The first brush 65 is electrically conductive and is urged into contact with the commutator 28 on the armature 26, thereby supplying current to the armature 26. The energized armature 26 is also in contact with the second brush 67 inside the second brush housing 66. Current flows through the second brush 67 and into the second brush wire 94 to the second dual tang terminal 74. Current then flows from the second start wire 102 into the second coil wire 104, thereby energizing the second pole 22. Finally current flows through the second finish wire 106 out to the internal terminal 48 of the switch 40. As is known in the art, a current flowing through the first pole 20 and the second pole 22 generates a magnetic field. The armature 26, with current flowing through it, is induced to rotate about the axis A-A.

Manufacture of Motor

Figure 9:
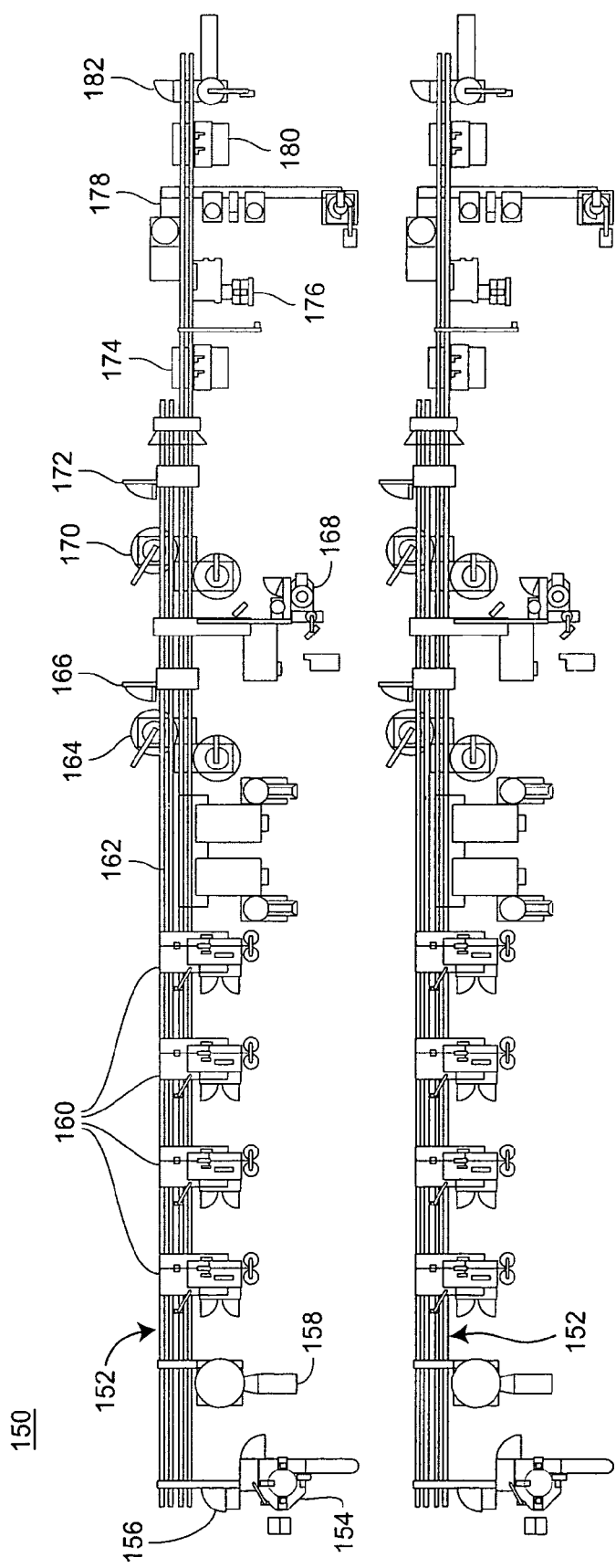
FIG. 9 is a layout view of the assembly line for the motor of FIG. 1.

The motor 10 as described herein can be manufactured in the following manner. FIG. 9 discloses a production floor 150 including a pair of assembly lines 152 with several work stations which work together to manufacture the described electric motor 10. While two assembly lines 152 are depicted, they are identical and each one can independently manufacture the motor 10. The motor 10 is transferred from one station to the next via a pallet conveyor as is known in the art.

In the first station 154, the laminations 30 are automatically stacked and welded together. Torroid sensing of weld current is used to insure welds are occurring. In the second station 156, an automatic load/unload machine automatically forms, cuts to length, and inserts insulation material into the stator 12.

In the third station 158, the winding board 14 is placed on the stator 12. At the fourth station 160, the first and second magnet wires 76, 78 are wound about the stator 12 and the winding board 14 to create the first pole 20 and the second pole 22. The formation of the poles 20, 22 about the winding board 14 and the stator 12 helps to secure the winding board 14 to the stator 12.

At the fifth station 162, both the switch 40 and the fuse 56 are disposed on the winding board 14. The switch 40 is disposed on the winding board 14 in the off position. At the sixth station 164, the first magnet wire 76 is disposed on the first block 50 of the internal terminal 48 of the switch 40 and across the input terminal 58 and the exit terminal 60 of the fuse 56. The second magnet wire 78 is disposed on second block 52 of the internal terminal 48 of the switch 40. At the seventh station 166, the tang terminals of the fuse 56 and the switch 40 and the first magnet wire 76 disposed therein are fused using an electrode weld.

At the eighth station 168, the lower housing 16 is assembled. This includes placing the dual tang terminals 68, 74 on the lower housing 16, inserting a bearing 120 into the lower housing 16, inserting the first and second brushes 65, 67 into the brush housings 64, 66, and connecting the brush wires 88, 94 from the second tangs 72, 100 of the dual tang terminals 68, 74 to the brush housings 64, 66. The lower housing 16 is further placed on the winding board 14.

The ninth station 170 is similar to the sixth station 164 in that it is also a wire placing station. At the ninth station 170, the first and second magnet wires 76, 78 are disposed on the first tangs 70, 98 of the dual tang terminals 68, 74 on the lower housing 16. The tenth station 172 is similar to the seventh station 166 in that it is a wire fusing station. At a tenth station 172, the first and second magnet wires 76, 78 are fused to the first tangs 70, 98 of the dual tang terminals 68, 74 on the lower housing 16. Further, the portion of the first magnet wire 76 between the input terminal 58 and the exit terminal 60 of the fuse 56 is severed to ensure that all current must flow through the conductor 62 for protection against the motor 10 overheating.

At an eleventh station 174, a field test is performed on the partially formed motor 10 including a Hi-pot/resistance test. Further, cement can have been previously disposed on the first magnet wire 76 and the second magnet wire 78 by the manufacturer of the wires. The cement is bonded through resistance heating to support and strengthen the first pole 20 and the second pole 22.

At a twelfth station 176, the armature 26 is inserted into the electric motor 10. As described earlier, the armature 26 is disposed into and through the bearing 120 in the lower housing 16 (See FIG. 8). In assembling the armature 26 to the lower housing 16, it is necessary to ensure that the first and second brushes 65, 67 and do not block the opening through which the armature 26 goes. In this example, the brushes 65, 67 are urged radially inward by springs 69. To block the brushes 65, 67 from moving inward, rivets can be disposed through the brush housings 64, 66. These rivets can be removed at a later station to allow the brushes to contact the armature.

In another example shown in FIG. 7, a blocker 122 is disposed through apertures 124 inside the brush housings 64, 66. In this example, a wireform is shown, however, those of skill in the art will see other elements that can impede the motion of the brushes 65, 67. In assembling the armature 26 to the lower housing 16, a shaft 126 of the armature 26 contacts the blocker 122 (FIG. 8) and pushes it out of the brush housings 64, 66 as the shaft 126 is inserted through the bearing 120 thereby releasing the brushes 65, 67. The brushes 65, 67 are then pushed against the commutator 28 by the springs 69.

At a thirteenth station 178, the upper housing 24 is placed and fastened to the stator 12 using two screws. At a fourteenth station 180, the armature 26 is aligned and motor 10 undergoes final testing, including a Hi pot test, no-load speed and current testing, and a voltage test. At a fifteenth station 182, the motor 10 is packed and prepared for transportation.

From the foregoing, one of ordinary skill in the art will appreciate that the present disclosure sets forth an electric motor and a method of manufacturing an electric motor. However, one of ordinary skill in the art could readily apply the novel teachings of this disclosure to any number of situations in which this device could be used. As such, the teachings of this disclosure shall not be considered to be limited to the specific examples disclosed herein, but to include all applications within the spirit and scope of the invention.

What is claimed is:

1. A method of making an electric motor, comprising:
   winding a first magnet wire about a first lug in a winding board and a first protrusion in a stator, the winding board being disposed on the stator and including a switch having at least an internal terminal, and a fuse having an input terminal and an exit terminal;
   laying the first magnet wire across the exit terminal and the input terminal on the fuse;
   connecting an end portion of the first magnet wire directly to the switch; and
   severing the first magnet wire between the input terminal and the exit terminal on the fuse.

2. The method of claim 1, further comprising routing the first magnet wire along the winding board under clips.

3. The method of claim 1, wherein the switch includes an internal terminal and an external terminal, the internal terminal includes a first block and a second block, and the first magnet wire is terminated on the first block.

4. The method of claim 3, wherein the first block and the second block include tang terminals and the first magnet wire is fused to the tang of the first block by welding.

5. The method of claim 1, wherein the input terminal and the exit terminal include tangs, and the first magnet wire is fused to the tangs by welding.

6. The method of claim 1, further comprising winding the first magnet wire about the first lug in the winding board and the first protrusion in the stator to form a first pole.

7. The method of claim 1, further comprising winding a second magnet wire about a second lug in the winding board and a second protrusion in the stator to form a second pole.

8. The method of claim 7, further comprising disposing the end of the second magnet wire on the second block of the internal terminal.

9. The method of claim 8, further comprising fusing the second magnet wire to the tang of the second block by welding.

* * * * *